Feb. 20, 1962   E. A. BROWN   3,022,110
BENCH CONSTRUCTION
Filed Feb. 2, 1959   2 Sheets-Sheet 1

INVENTOR
Eric A. Brown
BY Alex. E. MacRae
ATTORNEY

United States Patent Office 3,022,110
Patented Feb. 20, 1962

3,022,110
BENCH CONSTRUCTION
Eric A. Brown, Renfrew, Ontario, Canada, assignor to Polyfiber Limited, Renfrew, Ontario, Canada
Filed Feb. 2, 1959, Ser. No. 790,610
1 Claim. (Cl. 297—248)

This invention relates to multiple bench or seat construction.

An object of this invention is to provide a bench or seat structure which may be readily erected to accommodate any desired number of seats, which is subject to convenient and rapid assembly and disassembly for ease of transportation, storage and the like, which possesses satisfactory strength and rigidity in use, and which is of increased comfort to the user.

The invention contemplates the provision of a bench or seat structure comprising a plurality of preformed seats each having a seat section, a back section, and a flange extending rearwardly from each of the side edges of said sections, each said flange having a plurality of apertures therein, a plurality of rods each arranged to extend through one of said apertures in each said flange to lock said seats in assembled relation, and means engageable by said rods to support said rods and seats in upright position.

The invention will be described with reference to the accompanying drawings, in which—

Figure 1:
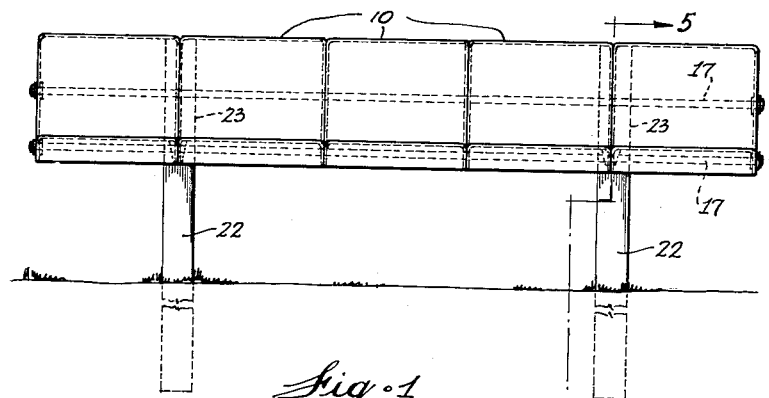
Figure 4:
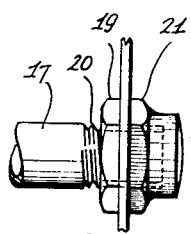
Figure 2:
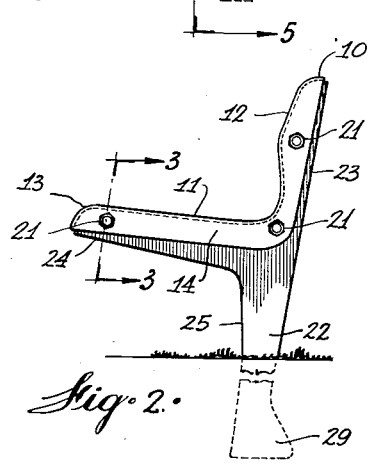
Figure 3:
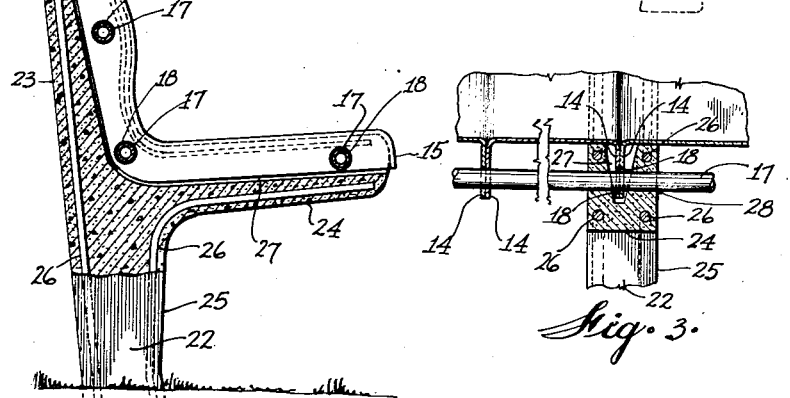
Figure 5:
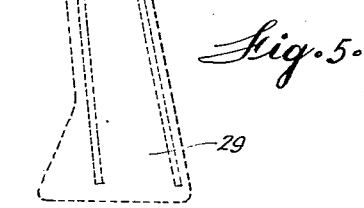
Figure 6:
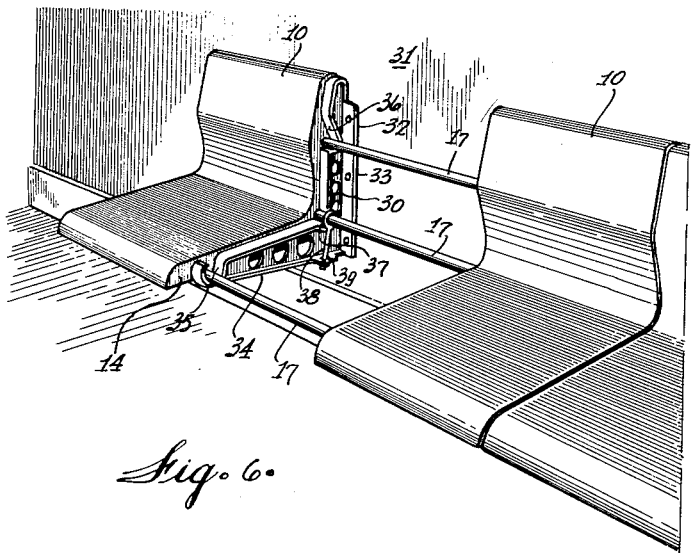
Figure 7:
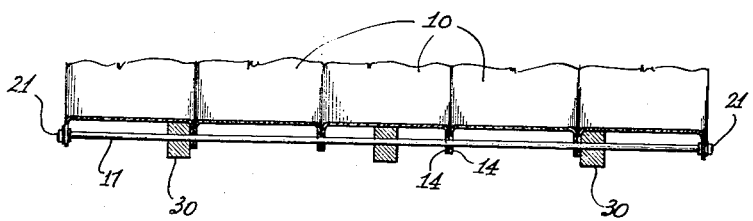

FIGURE 1 is a side elevation of a bench structure in accordance with the invention, FIGURE 2 is an end elevation of the structure shown in FIGURE 1, FIGURE 3 is a partial section on line 3—3 of FIGURE 2, FIGURE 4 is a side elevation of a rod securing means, FIGURE 5 is a section on line 5—5 of FIGURE 1, FIGURE 6 is a perspective view of a modified form of bench structure, and FIGURE 7 is a partial sectional side elevation of the structure shown in FIGURE 6.

In accordance with the invention, a plurality of individual or separate seat units 10 are provided each comprising a seat section 11 and a back section 12. Each section 11 and 12 has a forward surface 13 appropriately shaped to provide desired comfort to the user and rearwardly extending side edge flanges 14.

Preferably, each unit 10 is of one-piece molded construction and may be formed of a plastic composition such as polyester reinforced with glass fibers. As shown, the edge portion 15 of seat section 11 and the edge portion 16 of back section 12 are rearwardly curved and terminate in line with the rear edges of the flanges 14.

Means for assembling a plurality of seat units 10 in an aligned row to form a bench comprises a plurality of rods 17 which may consist of conventional pipe sections. Each rod 17 extends through aligned apertures 18 in the two flanges 14 of each unit 10. The diameter of each aperture 18 is such as to snugly receive the rod 17, i.e., it is slightly in excess of the external diameter of the rod to permit passage of the rod therethrough.

Each one of the rods 17 extends through each of the seat and back sections of the aligned units 10. As shown, three rods 17 are provided, one extending through the seat sections, one extending through the back sections, and one extending through the juncture areas between the two sections.

The seat units are aligned on the rods 17 with the flanges of adjacent seat units 10 in engagement. The units are maintained in such position by means of lock nuts 19 on threaded end portions 20 of the rods, such nuts being screwed into engagement with the inner surface of each end flange 14. A flange cap 21 is applied to the outer end of each rod.

Various means may be provided for mounting the multiple seat bench in elevated upright position for use, two such means being illustrated in the drawings.

The mounting means shown in FIGURES 1 to 5 comprises one or more leg members 22. Each leg member 22 has an upright portion 23 adapted to underlie a portion of a back section of a unit 10, a forwardly extending portion 24 adapted to underlie a portion of a seat section of a unit 10, and downwardly extending portion 25 constituting a leg.

As shown, each leg member 22 is of concrete construction provided with metal reinforcements 26. Preferably, the surfaces of the member for engagement by the seat units are of complementary shape. Means for locking the bench to each leg member comprises a groove 27 extending inwardly from the face of the portions 23 and 24 of the leg member and extending continuously between the ends of such portions. As shown in FIGURE 3, groove 27 is arranged to receive the abutting flanges 14 of an adjacent pair of seat units 10. The leg member also has a plurality of pairs of aligned holes 28, the axis of which extends across the groove 27 for alignment with the aligned apertures 18 in the flanges 14. It will thus be apparent that, following positioning of a pair of seat units 10, on a leg member 22, the rods 17 may be passed through the holes 28 and apertures 18 to lock the seat units to the leg member.

By reference to FIGURE 1, it will be observed that a bench comprising but two seat units 10 supported on a single leg member 22 may be provided. Should a longer bench be required an additional leg member and additional seat units may be provided as shown in FIGURE 1.

If the bench is to be located in a park or the like, the leg 25 of each leg member 22 may be of extended length, as shown, for burying in the ground. The end portion of the leg 25 may be enlarged as indicated at 29 to constitute an anchor.

FIGURES 6 and 7 illustrate an alternate form of mounting means for use in locations where a wall bench is required. As shown, one or more brackets 30 are fixed to a wall 31 as by means of an attaching flange 32. Each bracket has an upright portion 33 extending along the wall and a forwardly extending portion 34. Portion 34 has a notch 35 adjacent its forward end to receive the forward rod 17 of the bench assembly. Portion 33 has a notch 36 to receive the rearward rod 17 of the bench assembly. An intermediate notch 37 is provided in the bracket to receive the intermediate rod 17. The bench assembly is mounted on the brackets, preferably with at least one pair of abutting flanges 14 in engagement with a side surface of a bracket, as shown in FIGURE 7. Means for locking the bench assembly to the bracket comprises, as shown, an eye bolt 39 engaging the intermediate rod 17 and bolted to a lug 39 on the bracket.

There has been thus provided a multiple seat bench structure which is capable of easy and convenient erection and disassembly as required. Moreover, the bench structure described is capable of ready extension from two to any desired number of seat units. Furthermore, the structure described lends itself to use with either leg type or wall bracket supporting means without alteration of the basic structure.

I claim:

A bench structure comprising a plurality of preformed seats each having a seat section and a back section, each said seat having a flange on each side edge thereof, each said flange having a portion extending downwardly from said seat section and a portion extending rearwardly from said back section, said seats being aligned with at least one of said flanges of one of said seats in abutment with one of said flanges of another of said seats, each said flange having at least one aperture in each of said portions thereof, a rod extending through said apertures in said seat section flange portions, a rod extending through said apertures in said back section flange portions, means on the ends of said rods to lock said seats together, and means engaging said rods to support said rods and seats in upright position comprising at least two wall-supportable brackets, each said bracket having a wall-attachable base plate, a first portion extending longitudinally of said base plate and projecting outwardly therefrom, and a second portion extending substantially perpendicularly from said first portion, each said bracket being disposed between said flanges of one of said seats, each of said bracket portions having a notch therein for reception of one of said rods.

References Cited in the file of this patent

UNITED STATES PATENTS

| | | |
|---|---|---|
| D. 156,376 | Schladermundt et al. | Dec. 6, 1949 |
| 596,986 | Demarest | Jan. 11, 1898 |
| 724,583 | Jones | Apr. 7, 1903 |
| 1,206,203 | Brockway | Nov. 28, 1916 |
| 1,721,601 | McClure | July 23, 1929 |
| 1,862,382 | Mathis | June 7, 1932 |
| 2,113,103 | Yost et al. | Apr. 5, 1938 |
| 2,258,864 | Rieger | Oct. 14, 1941 |
| 2,278,049 | Zerbee | Mar. 31, 1942 |
| 2,311,482 | Smith | Feb. 16, 1943 |
| 2,454,912 | Cunningham | Nov. 30, 1948 |
| 2,556,077 | Evans et al. | June 5, 1951 |
| 2,812,800 | Eames | Nov. 12, 1957 |

FOREIGN PATENTS

| | | |
|---|---|---|
| 409,359 | Great Britain | Apr. 30, 1934 |